United States Patent [19]
LeBras

[11] Patent Number: 5,161,664
[45] Date of Patent: Nov. 10, 1992

[54] INFEED GROUPING MECHANISM FOR A PACKAGING MACHINE

[75] Inventor: Philippe LeBras, Chateauroux, France

[73] Assignee: The Mead Corporation, Dayton, Ohio

[21] Appl. No.: 879,506

[22] Filed: May 1, 1992

Related U.S. Application Data

[63] Continuation of Ser. No. 668,668, Mar. 13, 1991, abandoned.

[30] Foreign Application Priority Data

Mar. 13, 1990 [GB] United Kingdom ............... 9005610

[51] Int. Cl.$^5$ ............................................. B65G 47/26
[52] U.S. Cl. ........................... 198/419.3; 198/418.7; 198/465.2
[58] Field of Search ........... 198/419.3, 419.2, 418.7, 198/465.1, 465.2, 474.1

[56] References Cited

U.S. PATENT DOCUMENTS

| | | | |
|---|---|---|---|
| 2,789,683 | 4/1957 | Stahl | 198/465.2 X |
| 3,872,647 | 3/1975 | Langen et al. | 198/419.3 X |
| 3,956,868 | 5/1976 | Ganz et al. | 53/48 |
| 4,162,723 | 7/1979 | Kupper | 198/465.1 X |
| 4,552,261 | 11/1985 | Raudat et al. | 198/419.3 |
| 4,667,804 | 5/1987 | Dubuit et al. | 198/465.1 X |
| 4,693,055 | 9/1987 | Olsen et al. | 53/443 |
| 4,757,893 | 7/1988 | Shabram, Jr. et al. | 198/474.1 |

FOREIGN PATENT DOCUMENTS

| | | | |
|---|---|---|---|
| 0623863 | 11/1962 | Belgium | 198/419.3 |
| 2845978 | 4/1980 | Fed. Rep. of Germany | 198/465.2 |
| 1387932 | 12/1964 | France . | |
| 2163695 | 7/1973 | France . | |
| 2391939 | 12/1978 | France . | |
| 0011581 | 1/1977 | Japan | 198/465.1 |
| 1074354 | 7/1967 | United Kingdom | 198/465.2 |
| 1438531 | 6/1976 | United Kingdom | 198/419.3 |
| 1471957 | 4/1977 | United Kingdom . | |
| 1552994 | 9/1979 | United Kingdom . | |
| 1589540 | 5/1981 | United Kingdom . | |

*Primary Examiner*—Robert P. Olszewski
*Assistant Examiner*—James R. Bidwell
*Attorney, Agent, or Firm*—Thomas A. Boshinski

[57] ABSTRACT

A grouping mechanism (14) for grouping articles (B) in a continuous infeed stream comprises a series of spacer elements (16) adapted to engage successive articles from the infeed stream and locate the articles relative to one another as the articles are conveyed through a working reach (W) of the mechanism. The spacer elements have cam followers 18 for co-operating with a rotatable cylindrical cam which cause one group of articles to be spaced apart in the feed direction from a next succeeding group of articles while the spacer elements move through the working reach. A return transfer belt (40) is provided to return the spacer elements along a return reach (R) such that they are returned upstream of the working reach where they are disposed for engagement with successive articles in the infeed stream.

10 Claims, 2 Drawing Sheets

INFEED GROUPING MECHANISM FOR A PACKAGING MACHINE

This is a continuation of Ser. No. 07/668,668, filed Mar. 13, 1991, now abandoned.

This invention relates to a mechanism for grouping together a plurality of articles from an infeed stream at an infeed end of a packaging machine and is particularly useful for grouping together a plurality of cans or bottles in a multiple packaging machine.

In a known spacer and conveying mechanism disclosed in EP-A-O 126 553 a series of spacer elements are spaced apart at fixed locations on endless chains each spacer element being configured to engage a plurality of articles from an infeed stream of articles and convey those articles downstream of the machine. The spacing between each spacer element corresponds to the spacing between successive groups of articles.

In the present invention individual articles are engaged by individual spacer elements and a control device which may be a rotatable cylindrical cam having a helical cam track of variable pitch controls forward movement of the spacer elements. The control device is adapted to achieve a particular spacing arrangement so that, for example, a group of three spacer elements may be spaced apart from a next succeeding group of spacer elements so that the articles with which the spacer elements co-operate accordingly are similarly grouped and spaced.

One aspect of the present invention provides a grouping mechanism for grouping articles delivered to the mechanism from an infeed stream at an infeed end of a packaging machine, which mechanism comprises a series of spacer elements adapted to engage successive articles from the infeed stream and locate said articles relative to one another as the articles are conveyed through a working reach of said mechanism, said spacer elements having means for co-operating with control means which cause one group of articles comprising at least two successive articles to be spaced apart in the feed direction from a next succeeding group of articles while said spacer elements move through said working reach, transfer means being provided to return said spacer elements along a return reach such that they are returned upstream of said working reach where they are disposed for engagement with successive articles in said infeed stream.

According to a feature of this aspect of the invention said control means may be disposed in parallel relationship to the path of movement of said spacer elements in the working reach of said mechanism.

According to another feature of this aspect of the invention, said control means may comprise a rotatable cam and wherein said spacer elements may each include cam follower means for co-operation with said rotatable cam to control movement of said spacer elements through said working reach and may include an operative face remote from said cam follower means adapted to engage an article and transmit said control movement thereto. In constructions where the control means is a rotatable cam the control means may comprise a cylindrical body having a cam track provided by a continuous helical formation along said cylindrical body and wherein the pitch of said helical formation is varied along the length of the body to effect the desired spacing of one group of spacer elements from the next succeeding group of spacer elements in said feed direction.

According to yet another feature of this aspect of the invention, conveying means may be provided to introduce an infeed stream of articles into the working reach of said mechanism and wherein said spacer elements each engage individual articles upstream of said control means whereby feed movement is transmitted from said conveying means through said articles to said spacer means to advance said spacer means into engagement with said control means. In constructions where conveying means are provided to introduce an infeed stream of articles, successive groups of articles may be transferred from said conveying means onto support means within the working reach of said mechanism said transferred groups of articles being driven downstream of said conveying means by pusher elements operable in said working reach.

According to a still further feature of this aspect of the invention said transfer means may comprise an endless belt positioned for co-operation with said spacer elements which leave the downstream end of said control means after disengagement from said articles to return said spacer elements along said return reach of the mechanism to the upstream end of said control means. In mechanisms where the transfer means is an endless belt the endless belt may be a friction belt which engages said cam follower means of the spacer elements to return said spacer elements along said return reach.

According to yet another feature of this aspect of the invention guide means may be provided along the working reach of said mechanism remote from said spacer elements to maintain said articles in their designated feed path.

Preferably, guide followers are provided on said spacer elements for co-operation with guide tracks which define the path of movement of said spacer elements in the mechanism.

Another aspect of the invention provides a method of grouping articles delivered from an infeed stream which method comprises engaging successive articles with spacer elements from the infeed stream so that those articles are located relative to one another during feed movement of the articles, causing the spacer elements to be acted upon by control means so that one group of articles is advanced with respect to and thereby spaced from the next succeeding group of articles while the spacer elements move along the feed path of said articles and thereafter returning the spacer elements upstream of said control means such that they are appropriately spaced one from the next for engagement with successive articles in said infeed stream.

An embodiment of the invention grouping mechanism according to the invention will now be described, by way of example, with reference to the accompanying drawings, in which.

Figure 1:
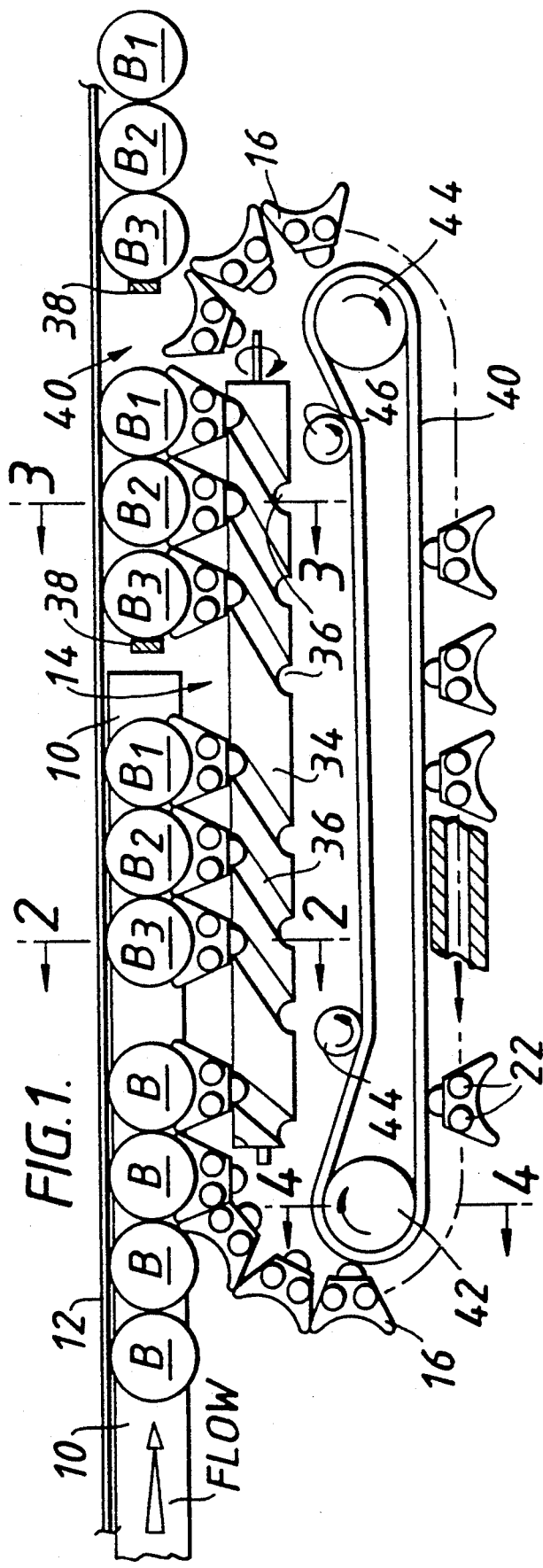
FIG. 1 is a schematic plan view of the grouping mechanism disposed alongside an article feed path at the infeed end of a packaging machine.

Referring to the drawings, a conveyor belt 10 moving on a support platform 10a introduces an infeed stream of articles such as cans or bottles "B" in side by side abutting relationship into the infeed end of a multiple packaging machine (not shown). Individual articles in abutting side-by-side relationship are fed along by the conveyor 10 and are guided along one side of the conveyor by an upstanding fixed guide plate 12.

The grouping mechanism 14 comprises an endless series of individual spacer elements 16 which are guided along in a generally ovate path and has a working reach "W" in which the spacer elements engage successive articles from the infeed stream and locate the articles relative to one another as they are conveyed through the working reach of the mechanism. The mechanism also includes a return reach "R" in which the spacer elements 16 are conveyed against the feed direction to be returned upstream of the working reach so that they are appropriately spaced one from the next for engagement with successive articles in the infeed stream.

Figure 1A:
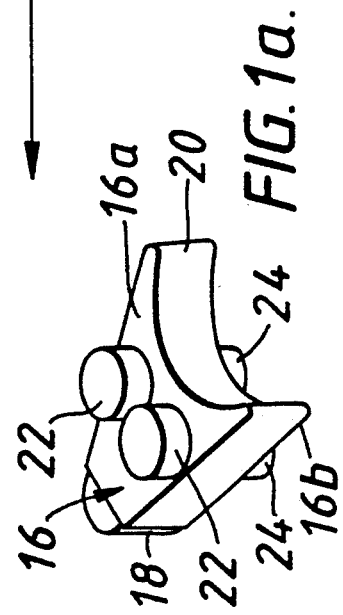
FIG. 1a is a detailed perspective view of one of the spacer elements of the mechanism.
Figure 2:
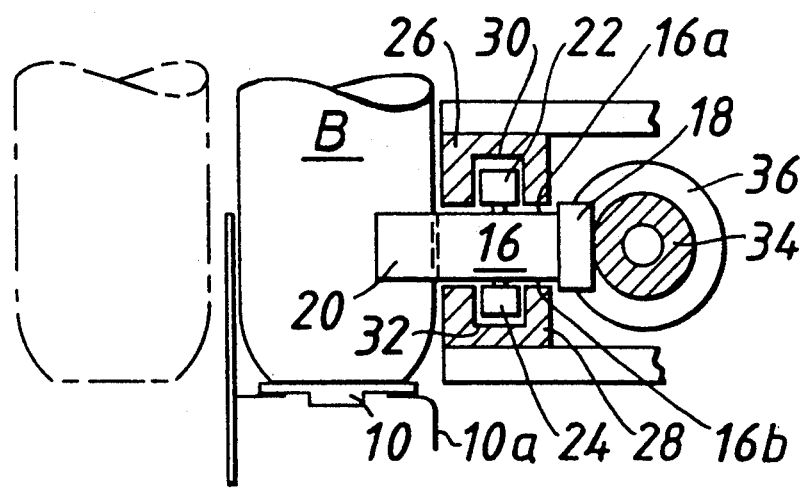
FIG. 2 is a schematic cross section taken along the line 2—2 in FIG. 1 of the drawings.
Figure 3:
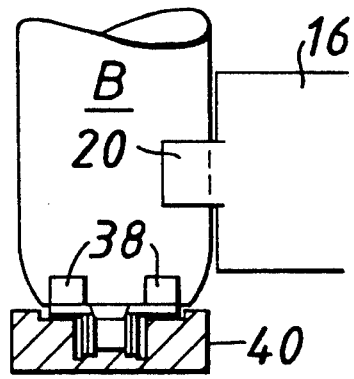
FIG. 3 is a schematic vertical cross section taken along the line 3—3 in FIG. 1 of the drawings.
Figure 4:
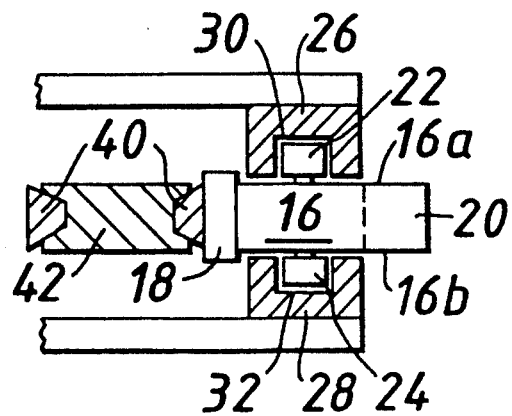
FIG. 4 is a schematic vertical cross section taken along the line 4—4 in FIG. 1 of the drawings.

As best seen in FIG. 1a of the drawings, each of the spacer elements 16 is of generally deltoid configuration having at its apex a part-cylindrical cam follower 18 and, at its opposite broader end, an operative face which comprises a part-cylindrical recess 20 which is shaped substantially to conform to a peripheral wall portion of a bottle or can which the element is to engage.

Intermediate the operative face 20 and the cam follower 16, each spacer element includes a pair of cylindrical guide projections 22, 24 upstanding from both its uppermost 16a and lowermost 16b surfaces. These guide projections engage in upper and lower guide tracks 26, 28 respectively, which define the generally ovate path in which the spacer elements are thereby constrained to move and are provided with upper and lower guide rails 30, 32 respectively in which the respective pairs of guide projections engage.

The working reach of the spacer elements is disposed intermediate the feed path of the articles on conveyor 10 to be grouped and a control device for controlling the movement of the guide elements through the working reach of the mechanism.

The control device comprises a cylindrical cam 34 having a continuous helical cam track 36 along its length and which is disposed with its longitudinal axis parallel to the article feedpath. The cylindrical cam is rotated about its longitudinal axis (not shown) by suitable drive means and is located such that as each spacer element approaches the cylindrical cam its cam follower engages in the helical cam track and is carried forward along the working reach in the downstream direction of the mechanism.

It will be seen that the helical pitch of the cam track is varied so that after an initial single turn the pitch elongates longitudinally of the cam whereafter three equidistant and relatively closely spaced complete helical revolutions are provided. Thereafter, the helical pitch again elongates longitudinally of the cam and a further three equidistant and relatively closely spaced complete helical revolutions are formed. This particular arrangement of the helical cam track causes a group of three spacer elements to be guided in side by side relationship but spaced from the next succeeding group of spacer elements. Thus the trailing article B3 in one group of articles will be spaced downstream of the leading article B1 in the next succeeding group. In this particular embodiment the spacer elements are grouped together in successive groups of three so that three articles in aligned and abutting relationship forming a first group of articles are spaced from a similar and next succeeding group of articles along the working reach of the mechanism. However, other group formations are envisaged by the substitution in the mechanism of different cam track formations. For example groups of two or four or five articles can readily be formed by providing a cylindrical cam with the appropriate helical pitch variation of its cam track.

At a location approximately intermediate the two groups of articles which are formed by the cylindrical cam in the working reach, the infeed conveyor 10 terminates and the successive groups of articles are transferred onto and thereafter conveyed downstream of the mechanism by an endless series of pusher elements which engage the trailing article B3 of each of the groups B1-B3. This form of pusher element 38 is well known in the art and normally would be provided at spaced intervals along an endless chain having a working reach immediately below a support platform 39 for the articles.

As successive spacer elements leave the downstream end of the cylindrical cam, having achieved the grouping of the articles, they are temporarily free from direct forward drive but as a line pressure is built up in the fixed guides the spacer elements engage one another and are thereby pushed along their guide track and contact an endless friction belt 40 entrained about a pair of spaced drive sprockets 42 and 44.

The rotating friction belt 40 engages the cam follower 18 of each of the spacer elements 16 and conveys the spacer elements along the return reach "R" of the mechanism so that they are returned upstream of the working reach to a reservoir or staging area where they are disposed for engagement with successive articles in the infeed stream upstream of the cylindrical cam 34. Along a return reach of the friction belt 40 a pair of tensioning rollers 44, 46 are provided adjacent each of the drive sprockets to keep the working reach of the belt taut.

It is envisaged that a similar grouping mechanism may be provided on the other side of the upstanding longitudinal guide 12 so that articles are conveyed in groups of two rows for subsequent packaging. It will be appreciated that other grouping formations may be accomplished by substituting the cylindrical cam for one having a different cam track helical pitch arrangement. Where such alternative cylindrical cams are used in conjunction with an arrangement including two such grouping mechanisms it is possible to produce groups of articles having, for example, six articles arranged in two rows of three or four articles arranged in two groups of two or simply two articles in side by side relationship on either side of the fixed guide 12.

What I claim is:

1. A grouping mechanism for grouping articles delivered to the mechanism from an infeed stream at an infeed end of a packaging machine, which mechanism comprises a series of spacer elements adapted to engage successive articles from the infeed stream and locate said articles relative to one another as the articles are conveyed through a working reach of said mechanism, said spacer elements having means for co-operating with control means which cause one group of articles comprising at least two successive articles to be spaced apart in the feed direction from a next succeeding group of articles while said spacer elements move through said working reach, transfer means being provided to return said spacer elements along a return reach such that they are returned upstream of said working reach where they are disposed for engagement with successive articles in said infeed stream, wherein conveying means is provided to introduce an infeed stream of articles into the working reach of said mechanism and wherein said spacer elements each engage individual articles upstream of said control means whereby feed movement is transmitted from said conveying means through said articles to said spacer means to advance said spacer means into engagement with said control means.

2. A grouping mechanism according to claim 1 wherein said control means is disposed in parallel relationship to the path of movement of said spacer elements in the working reach of said mechanism.

3. A grouping mechanism according to claim 1
   wherein said control means comprises a rotatable cam and wherein said spacer elements each include cam follower means for co-operation with said rotatable cam to control movement of said spacer elements through said working reach and include an operative face remote from said cam follower means adapted to engage an article and transmit said control movement thereto.

4. A grouping mechanism according to claim 3, wherein said control means comprises a cylindrical body having a cam track provided by a continuous helical formation along said cylindrical body and wherein the pitch of said helical formation is varied along the length of the body to effect the desired spacing of one group of spacer elements from the next succeeding group of spacer elements in said feed direction.

5. A grouping mechanism according to claim 3
   wherein guide followers are provided on said spacer elements for co-operation with guide tracks provided outside said working reach of the mechanism.

6. A grouping mechanism according to claim 1 wherein successive groups of articles are transferred from said conveying means onto support means within the working reach of said mechanism said transferred groups of articles being driven downstream of said conveying means by pusher elements operable in said working reach.

7. A grouping mechanism according to claim 1 wherein said transfer means comprises an endless belt positioned for co-operation with said spacer elements which leave the downstream end of said control means after disengagement from said articles to return said spacer elements along said return reach of the mechanism to the upstream end of said control means.

8. A grouping mechanism according to claim 7, wherein said endless belt is a friction belt which engages said cam follower means of the spacer elements to return said spacer elements along said return reach.

9. A grouping mechanism according to claim 1
   wherein guide means are provided along the working reach of said mechanism remote from said spacer elements to maintain said articles in their designated feed path.

10. A method of grouping articles delivered from an infeed stream which method comprises engaging successive articles with spacer elements from the infeed stream so that those articles are located relative to one another during feed movement of the articles, causing the spacer elements to be acted upon by control means so that one group of articles is advanced with respect to and thereby spaced from the next succeeding group of articles while the spacer elements move along the feed path of said articles and thereafter returning the spacer elements upstream of said control means such that they are appropriately spaced one from the next for engagement with successive articles in said infeed stream, wherein the infeed stream of articles is conveyed into said spacer elements upstream of said control means to transmit feed movement from the conveyed infeed stream to said spacer elements to advance said spacer elements into engagement with said control means.

* * * * *